United States Patent
Dai et al.

(10) Patent No.: US 7,176,848 B1
(45) Date of Patent: Feb. 13, 2007

(54) METHOD OF SYNCHRONIZING IMAGES ON MULTIPLE DISPLAY DEVICES WITH DIFFERENT REFRESH RATES

(75) Inventors: Jianing Dai, Richmond Hill (CA); Wai Ki Lo, Richmond Hill (CA); Peter X. Cao, Markham (CA); Anand Dua, Woodbridge (CA)

(73) Assignee: ATI Technologies, Inc., Toronto (CA)

( * ) Notice: Subject to any disclaimer, the term of this patent is extended or adjusted under 35 U.S.C. 154(b) by 172 days.

(21) Appl. No.: 10/413,704

(22) Filed: Apr. 14, 2003

(51) Int. Cl.
*G09G 5/00* (2006.01)

(52) U.S. Cl. ........................ 345/2.2; 345/3.2

(58) Field of Classification Search ......... 345/1.1–1.3, 345/3.1, 3.3, 3.4, 543, 544, 113, 558, 5, 2.1, 345/2.2, 2.3, 3.2
See application file for complete search history.

(56) References Cited

U.S. PATENT DOCUMENTS

| | | | | |
|---|---|---|---|---|
| 4,933,840 A | * | 6/1990 | Sera et al. | 710/57 |
| 5,488,385 A | * | 1/1996 | Singhal et al. | 345/3.1 |
| 5,727,192 A | * | 3/1998 | Baldwin | 345/522 |
| 5,844,569 A | | 12/1998 | Eisler et al. | |
| 5,956,046 A | * | 9/1999 | Kehlet et al. | 345/502 |
| 5,969,728 A | * | 10/1999 | Dye et al. | 345/553 |
| 6,100,906 A | * | 8/2000 | Asaro et al. | 345/539 |

* cited by examiner

*Primary Examiner*—Amr A. Awad
*Assistant Examiner*—Steven Holton

(57) ABSTRACT

A method for displaying images on multiple monitors with different refresh rates is disclosed. To prevent screen tearing, the surface containing image data is not released when the access by the master monitor is completed until the slave monitor or monitors finish access. To synchronize images with a predefined playback speed, the surface containing a new image received from the application is not flipped onto the screens until receiving a predefined synchronization indicator.

14 Claims, 5 Drawing Sheets

| T | APPLICATION FLIP | SURFACE QUEUED | DRIVER FLIP | SURFACE DATA RELEASE | VSYNC MASTER | SURFACE DATA MASTER | VSYNC SLAVE | SURFACE DATA SLAVE | 1ST SURFACE LOCATION | 2ND SURFACE LOCATION | 3RD SURFACE LOCATION | 4TH SURFACE LOCATION |
|---|---|---|---|---|---|---|---|---|---|---|---|---|
| 0 |  | S2 |  |  |  | X |  | X | S1 | S2 | X | X |
| 1 |  |  | S1 |  | X | S1 | X | S1 | S1 | S2 | X | X |
| 2 |  |  |  |  |  | S1 |  | S1 | S1 | S2 | X | X |
| 3 |  |  |  |  |  | S1 |  | S1 | S1 | S2 | X | X |
| 4 | S3 |  |  |  |  | S1 |  | S1 | S1 | S2 | X | X |
| 5 |  | S3 |  |  |  | S1 |  | S1 | S1 | S2 | S3 | X |
| 6 |  |  |  |  |  | S1 |  | S1 | S1 | S2 | S3 | X |
| 7 |  |  | S2 |  | X | S2 |  | S1 | S1 | S2 | S3 | X |
| 8 |  |  |  |  |  | S2 |  | S1 | S1 | S2 | S3 | X |
| 9 | S4 |  |  |  |  | S2 | X | S2 | S1 | S2 | S3 | X |
| 10 |  | S4 |  |  |  | S2 |  | S2 | S1 | S2 | S3 | S4 |
| 11 |  |  |  |  |  | S2 |  | S2 | S1 | S2 | S3 | S4 |
| 12 |  |  |  |  |  | S2 |  | S2 | S1 | S2 | S3 | S4 |
| 13 |  |  | S3 | S1 | X | S3 |  | S2 | X | S2 | S3 | S4 |
| 14 |  |  |  |  |  | S3 |  | S2 | X | S2 | S3 | S4 |
| 15 |  |  |  |  |  | S3 |  | S2 | X | S2 | S3 | S4 |
| 16 | S5 |  |  |  |  | S3 |  | S2 | X | S2 | S3 | S4 |
| 17 |  | S5 |  |  |  | S3 | X | S3 | S5 | S2 | S3 | S4 |
| 18 |  |  |  |  |  | S3 |  | S3 | S5 | S2 | S3 | S4 |
| 19 |  |  | S4 | S2 | X | S4 |  | S3 | S5 | X | S3 | S4 |
| 20 |  |  |  |  |  | S4 |  | S3 | S5 | X | S3 | S4 |
| 21 |  |  |  |  |  | S4 |  | S3 | S5 | X | S3 | S4 |
| 22 |  |  |  |  |  | S4 |  | S3 | S5 | X | S3 | S4 |
| 23 |  |  |  |  |  | S4 |  | S3 | S5 | X | S3 | S4 |
| 24 |  |  |  |  |  | S4 |  | S3 | S5 | X | S3 | S4 |
| 25 |  |  | S5 | S3 | X | S5 | X | S5 | S5 | X | X | S4 |
| 26 |  |  |  |  |  | S5 |  | S5 | S5 | X | X | S4 |
| 27 |  |  |  |  |  | S5 |  | S5 | S5 | X | X | S4 |
| 28 |  |  |  |  |  | S5 |  | S5 | S5 | X | X | S4 |
| 29 | S6 |  |  |  |  | S5 |  | S5 | S5 | X | X | S4 |
| 30 |  | S6 |  |  |  | S5 |  | S5 | S5 | S6 | X | S4 |
| 31 |  |  | S6 | S4 | X | S5 |  | S5 | S5 | S6 | X | X |
| 32 |  |  |  |  |  | S5 |  | S5 | S5 | S6 | X | X |
| 33 |  |  |  |  |  | S5 | X | S6 | S5 | S6 | X | X |
| 34 | S7 |  |  |  |  | S5 |  | S6 | S5 | S6 | X | X |
| 35 |  | S7 |  |  |  | S5 |  | S6 | S5 | S6 | S7 | X |
| 36 |  |  |  |  |  | S5 |  | S6 | S5 | S6 | S7 | X |
| 37 |  |  | S7 | S5 | X | S6 |  | S6 | X | S6 | S7 | X |
| 38 |  |  |  |  |  | S6 |  | S6 | X | S6 | S7 | X |
| 39 | S8 |  |  |  |  | S6 |  | S6 | X | S6 | S7 | X |
| 40 |  | S8 |  |  |  | S6 |  | S6 | X | S6 | S7 | S8 |

FIG. 2

METHOD OF SYNCHRONIZING IMAGES ON MULTIPLE DISPLAY DEVICES WITH DIFFERENT REFRESH RATES

BACKGROUND

A personal computer (PC) system may house one or more graphics subsystems. A graphics subsystem may have one or more display controllers, each of which is attached to a display device such as a VGA monitor or a TV. In the following, a display controller and its attached monitor/TV will generally be referred to as a display device when no ambiguity exists.

Microsoft's Windows family operation systems have become the industry's de facto standard. Their methods of displaying images/video have been patented under U.S. Pat. Nos. 5,844,569 and 5,850,232. When displaying a sequence of images, such as playing DVD, individual images are rendered into image buffers (surface locations), or blocks of video memory, and then the image buffers are displayed sequentially according to a specified timing. This display method is commonly termed as flip, meaning that the image buffer currently on display is replaced by another buffer containing a new image. The replaced image buffer becomes available again for receiving a newer image. In another term, the buffers are swapped.

However, the methods described in the referred patents are limited to the case where the image or video is shown on one display device, either in a window of the display or in the full screen. The two display modes will be referred to as the window mode and the full screen mode respectively. When a computer system has two display devices, Windows has two methods of showing the image. One is to duplicate the screen of one display to another, commonly referred to as the clone mode, whether the image is shown in a window or in a full screen. The other is to show the image on one of the display devices, which is often referred to as the extended desktop mode. A limitation of the clone mode is that the two monitors have to be set to identical refresh rates.

As such, Microsoft's methods are incapable of supporting the application where the user requires one of the displays to be his/her conventional working desktop with an image displayed in an overlay window while using the other display to show a full screen image for examining details of the image. For example, video editing is such a typical application. Also, the user may prefer his/her working desktop to be a monitor with high refresh rate, e.g. 85 Hz, for reduced flicking and the second monitor to be a TV to comply with the TV standard, such as PAL for which the refresh rate is 50 Hz, in order to maintain the correct playback speed.

A problem associated with displaying video simultaneously on multiple monitors with different refresh rates is screen tearing. The problem may not be noticeable when the system displays static images, such as the PC desktop. However, the problem is obvious when displaying moving images, such as movie. The causes of the problem are due to variations in phase and timing of vertical scans, as well as refresh rates, of multiple display devices. In the case of two displays having different refresh rates, the update to a new video buffer (referred to as a surface location, or image location when no ambiguity exists) can only be synchronized to one of the display devices while the same buffer is scanned by both display devices. Since the scans of two devices are generally not synchronized, at a given time instance, one display device may be scanning one line of pixels of an image while the other is scanning another line. To maintain the playback at a constant speed, the image buffers are swapped at predefined time instants, such as the VSYNC signal, and the probability is very high that one display device finishes scanning an image buffer while the other is still in the middle of scanning. With the conventional flip method, the buffer swapped out is released immediately for reuse. If the application renders a new image to this buffer before the second display device finishes scanning, screen tearing occurs.

A solution to the tearing problem is to copy, with or without scaling, the image to an auxiliary video buffer, and display the image of the auxiliary buffer in full screen on the second display device. One of the shortcomings of this approach is that at least two auxiliary buffers are required. The other is that it requires an extra bandwidth from the graphics processor to duplicate images to the auxiliary buffers. Therefore, a system and/or method capable of displaying images on multiple monitors without an extra cost of either video memory or graphics processor's bandwidth is desirable.

FIELD OF THE INVENTION

The present disclosure relates generally to the display of data, and more particularly, to the display of images simultaneously on multiple monitors with different refresh rates.

BRIEF DESCRIPTION OF THE DRAWINGS

The present disclosure may be better understood, and its numerous features and advantages made apparent to those skilled in the art by referencing the accompanying drawings.

FIG. 2 illustrates, in tabular form, timing information associated with a specific embodiment of the disclosure;

DESCRIPTION OF THE DRAWINGS

In accordance with a specific embodiment of the present disclosure, a plurality of display controllers can access display data stored at a single surface location for display on multiple display devices. The single surface location can be accessed simultaneously by the plurality of display controllers. In order to assure no screen tearing occurs on any of the display devices, surface data is maintained for two or more vertical refresh cycles of the master device. Specific details will be better understood with reference to FIGS. 1–5 which illustrate specific embodiments of the present disclosure.

Figure 1:
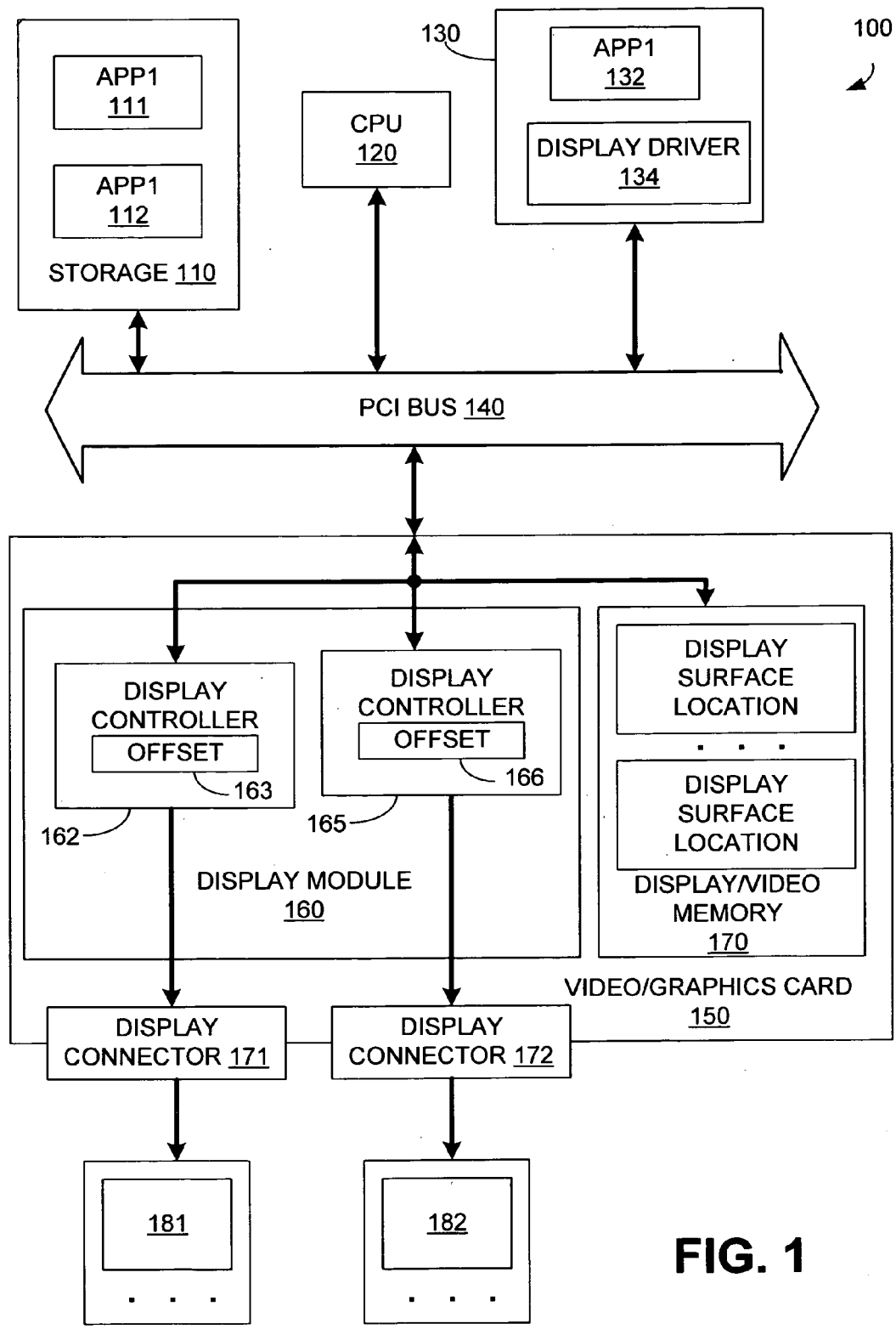
FIG. 1 illustrates, in block diagram form, a system in accordance with the present disclosure.

FIG. 1 illustrates a system 100. The system 100 comprises a central processing unit 120, a storage area 110, a system memory 130, a system bus 140, a video/graphics card 150, and multiple display devices 181 and 182.

The system bus 140, which is illustrated to be a PCI bus, is coupled to the storage area 110, the central processor unit (CPU) 120, and the video/graphics card 150. The storage area 110 would typically represent non-volatile storage, such as a hard drive, CD ROM, or other storage media. The storage area 110 is illustrated to store a first application 111 and a second application 112, although in other embodiments it can also store the display driver 134. The CPU 120 represents any of a number of commercially-available or proprietary central processing units capable of executing instructions. The system memory 130 is typically a volatile memory, such as a random access memory, and is illustrated as currently storing a first application 132 and the display driver 134.

The first application 132 stored in system memory 130 corresponds to at least a portion of the application 111 stored in the storage area 110. It will be appreciated that the first application 132 can represent all or some of the first application 111 from the storage area 110. As is well known in the art, applications presently being executed are typically stored in system memory 130 such that access of instructions by CPU 120 occurs at a high bandwidth. The display drivers 134 provide an interface between various system applications, and the video/graphics card 150.

The video/graphics card 150 includes a display module 160, a display memory 170, and a plurality of display connectors 171 and 172. The display module 160 further includes a first display controller 162 and a second display controller 165.

In operation, the display controller 162 accesses surface data and provides it to a display connector 171 for a display on a display device 181. In a similar manner, the display controller 165 accesses surface data and provides it to the display connector 172 for display on a display device 182. In the specific illustrated embodiment, each of the display controllers 162 and 165 has an offset register location 163 and 166, respectively. An offset register can be the one that allows displaying an image buffer on the entire screen, or an overlay register that supports displaying an image buffer in a window of the screen. The offset register locations 163 and 166 indicate where specific surface data to be accessed by their respective controllers is located.

During one mode of operation, the display controllers 162 and 165 are controlled independently by the display driver 134 to access and display different surface data store at different surface locations. This is facilitated by having offset register locations 163 and 166 set to different offset values indicating different surface locations. In another mode of operation, Display controllers 162 and 165 are controlled by the display driver 134 to access and display a common surface data. This is facilitated by the offset values stored at locations 163 and 166 being be set to the same offset value to allow the display controllers 162 and 165 to access data from the same surface location.

In one embodiment, one of the display controllers 162 and 165 is identified as a master display controller. Typically, the monitor with the fastest refresh, controller 162 for purposes of discussion, will be selected as the master display controller. Note that it is recommended that the refresh rate of the monitor with the fastest refresh be less than twice as fast as the refresh rate of the other monitor. There is no such restriction if the monitor with slower refresh rate is designated as the master. A vertical synchronization indicator (VSYNC) from the master controller is provided to the display driver 134. The vertical synchronization indicator can be an interrupt that is recognized by the display driver 134, or a value stored at a predefined memory location that is polled by the display driver 134 to determine if the offset registers 163 and 166 need to be updated. The other display controller, controller 165, is referred to as a slave display controller.

Figure 3:
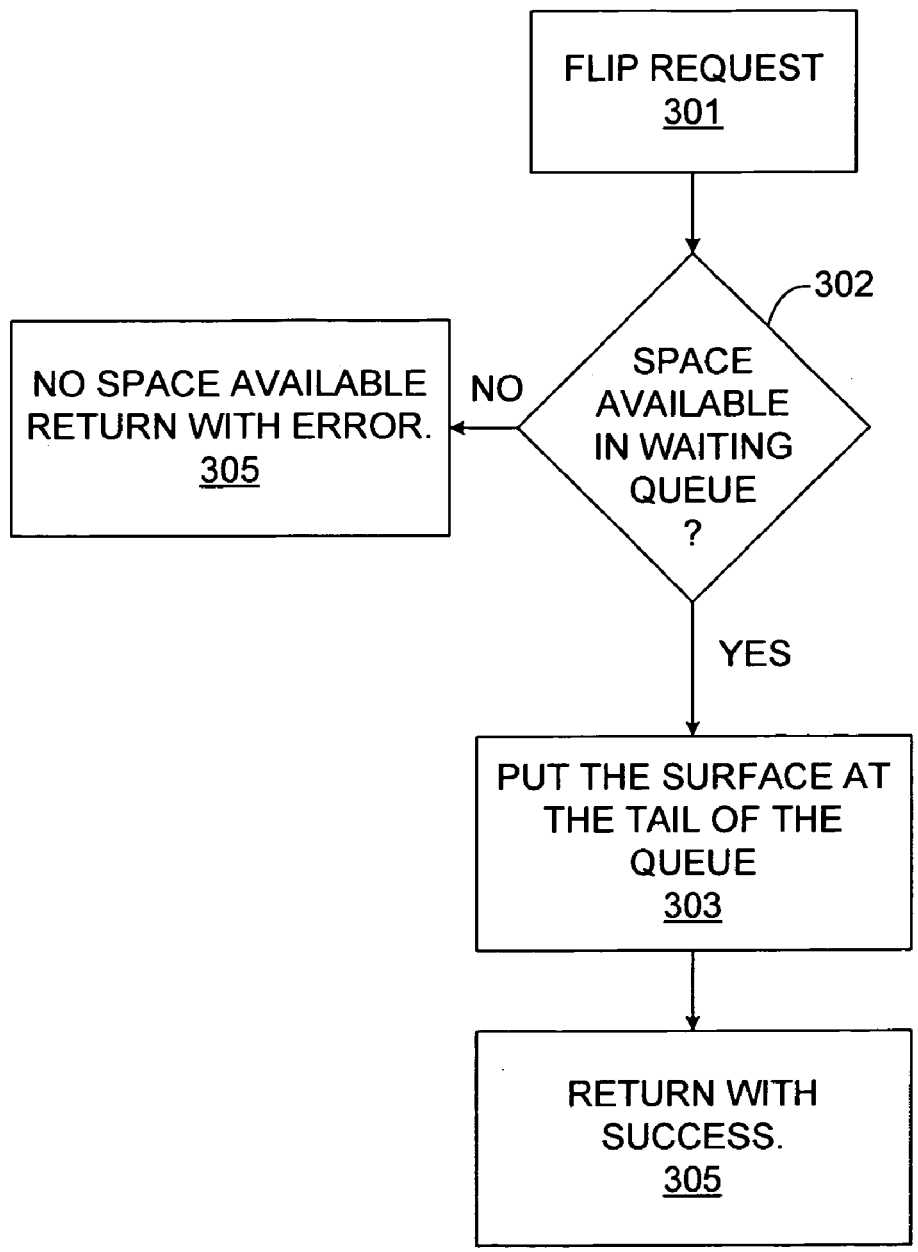
FIGS. 3–5 illustrates, in flow diagram form, methods associated with specific embodiments of the disclosure.
Figure 4:
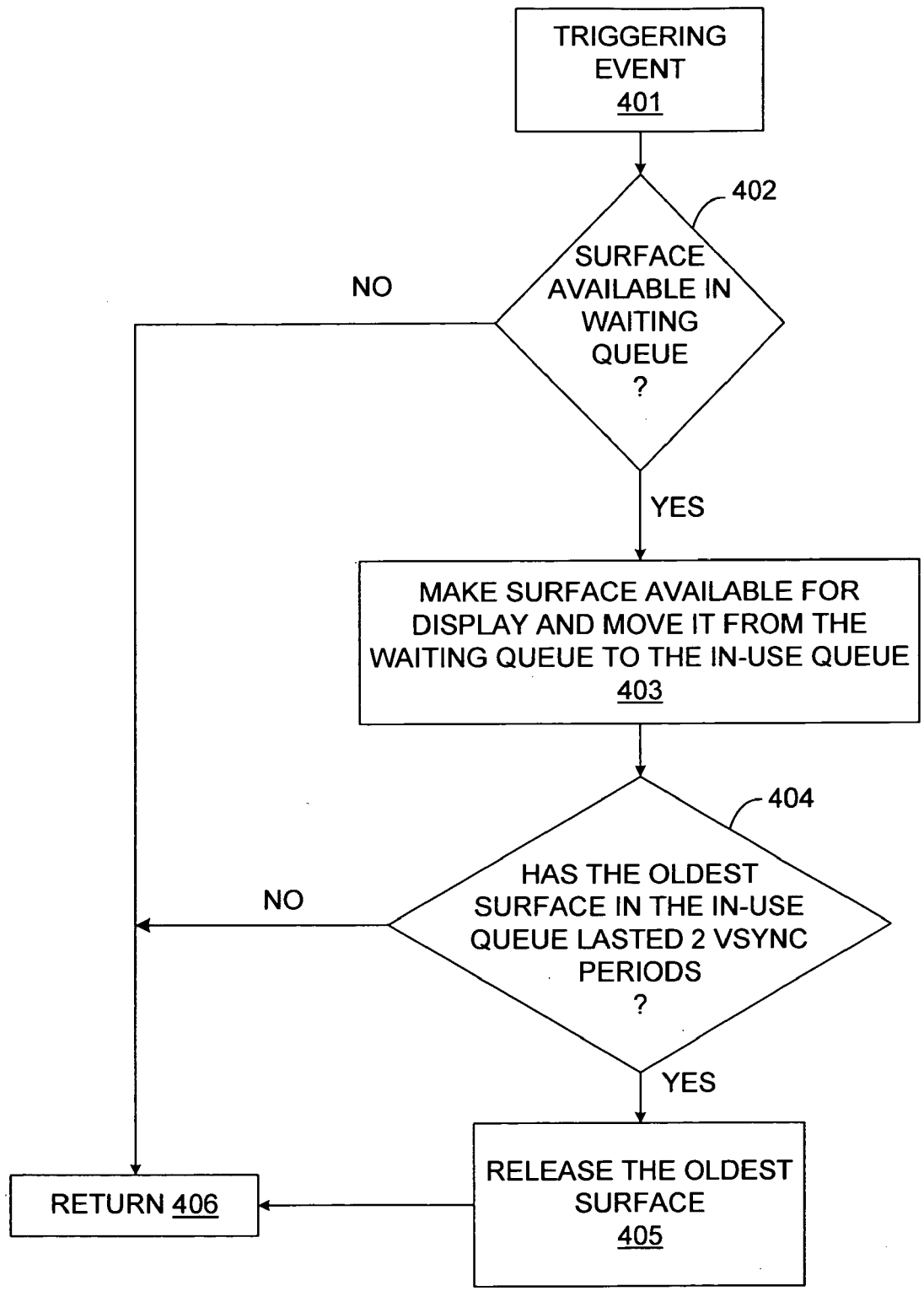
Figure 5:
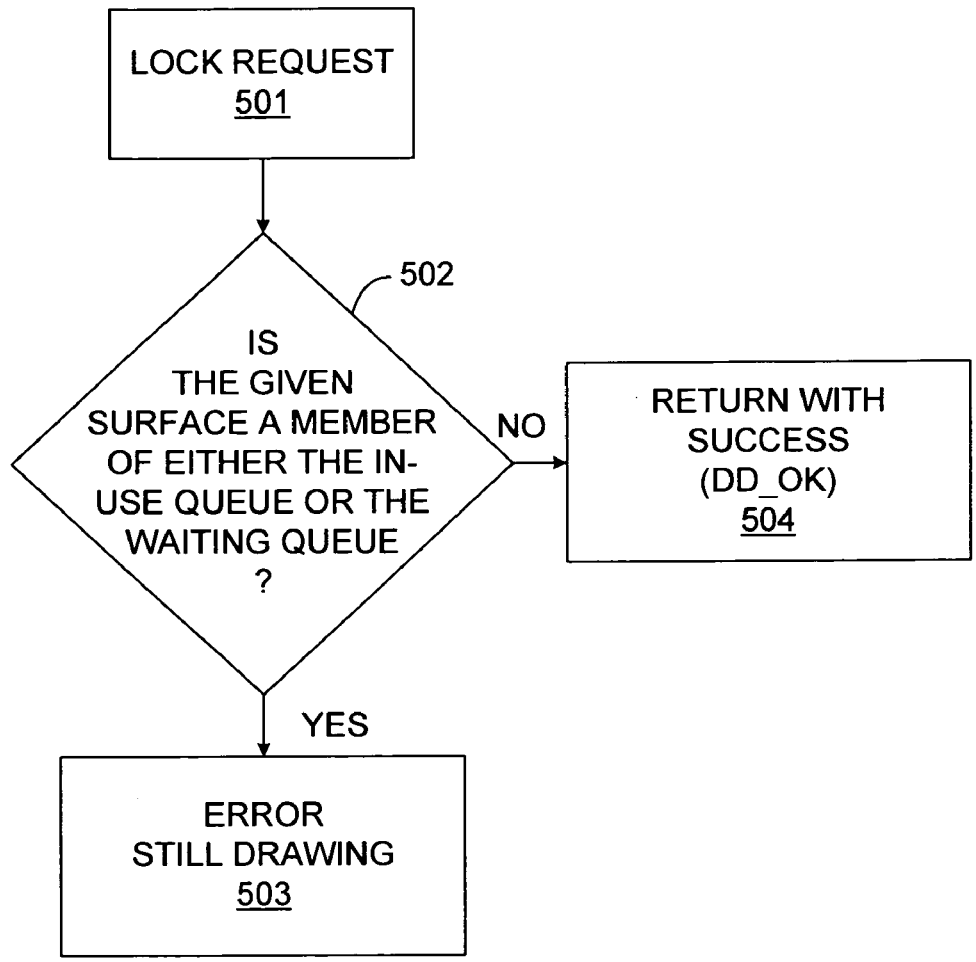

FIG. 2 illustrates, in tabular form, timing information in accordance with embodiments, and FIGS. 3–5 illustrate specific methods that are related to the timing information of FIG. 2.

Each of the rows of the table of FIG. 2 represents a specific period of time labeled T0 through T40, when an event occurs and the state of the system changes. Each of the columns of the table of FIG. 2 represents a specific event and/or state relating to the system 100.

The four right-most columns of FIG. 2 represent specific surface locations in video memory, and for each time period an indicator representing surface data controlled by the display driver is listed. An X in one of the surface location columns indicates when the surface location is not being controlled by the display driver and is available to receive new surface data, or, in the case of time T0, the data is not of interest for the discussions herein. For example, at time T0, the driver has control of the $1^{st}$ surface location that contains surface data S1, and the 2nd surface location that contains surface data S2, and the $3^{rd}$ and $4^{th}$ surface locations are not controlled by the display driver, or not of interest at the specific time. It will be appreciated that the four surface locations can be managed using a variety of techniques. For example, the surface locations can be managed as part of a queue structure, whereby depending upon the order that surface data was received at the video memory, the surface location containing the surface data can be treated as a member of an in-use queue or a waiting queue. An in-use queue is a queue that indicates which surface locations contain data that is being, or can be, actively displayed by one of the controllers 162 or 165. A waiting queue is a queue that holds, or can hold, surface data not yet in the in-use queue. While the terms in-use queue and waiting queue are used herein, it will also be appreciated that the display driver 134 can manage surface locations using other methods based on different queue structures or no queue structures.

Column 5 of the table of FIG. 2 is labeled VSYNC MASTER. When the master display controller 162 generates a vertical synchronization indicator (VSYNC), it notifies the event to the display driver 134. The receipt of a vertical synchronization indicator by the display driver 134 from the master controller 162 is indicated in the VSYNC Master column of the table of FIG. 2 by an X.

Column 6, labeled Surface Data Master, indicates the surface data being accessed by the master display controller for display at any given time. For example, at time T1, the surface data S1, stored at the 1st surface location, is being accessed by the master controller 22 for display.

Column 7, labeled VSYNC Slave, indicates when the slave display controller generates a vertical synchronization indicator. Note that with the specific embodiment, that when multiple displays are being driven by multiple display controllers, the vertical synchronization indicator generated by a slave display controller is ignored by the display driver 134. However, the slave VSYNC will trigger the graphics hardware to update the offset of the slave controller with a new surface, such as S2 at T9.

Column 8, labeled Surface Data Slave, indicates which surface is being accessed by the slave display controller at a specific time. For example, at time T1, the surface data S1, stored at the first surface location, is being accessed by the slave controller for display.

The first column of FIG. 2 is labeled APPLICATION FLIP. An entry in the APPLICATION FLIP column indicates a specified surface data has been prepared by an application, such as application 132, and the display driver 134 has been notified. Step 301, of the method of FIG. 3, corresponds to a flip request from the application, resulting in the indicator being listed in the Application Flip column of FIG. 2. For example, at time T4, the Application Flip column contains specific surface indicator S3 indicating that a flip request from an application 132 has been received at the display driver 134 and that surface data S3 is ready. Because the surface data prepared by the application may be originally stored in system memory 130 or display memory 170, the surface data is not listed at a surface location in the last four columns of FIG. 2 at the time of the flip access. However, it will be appreciated that in specific implementations that the surface data may already reside in one of the surface locations.

The second column of the table of FIG. 2 is labeled Surface Queued. A specific surface indicator is placed in the Surface Queued column to indicate when the display driver 134 has queued, or taken control of, the indicated surface in response to a Flip call from the application 132. For example, at time T5, the surface data S3, which was flipped by the application at time T4, has been queued by the display driver 134. Once a surface data is queued, it is listed in one of the surface data locations. Therefore, the surface data S3 is illustrated at time T5 to be stored in the $3^{rd}$ surface location. It will be appreciated that in other embodiments, the data can be queued at relevant time period when a flip call is received by the display driver. FIG. 3 illustrated a specific method that may be associated with queuing surface data.

At step 302, of the method of FIG. 3, a determination is made whether space is available in a waiting queue maintained by the display driver 134. If space is available, flow proceeds to step 303, otherwise, flow proceeds to step 305 which indicates to the application that the driver was unable to service the flip request at this time. At step 303, the surface location storing the surface data is put at the tail of the waiting queue, and an indication of a successful flip request is provided to the application. For example, the indicator S3 at time T5 of FIG. 2 indicates that step 303 has been successfully completed and that the surface is being managed by the display driver.

As previously discussed, it will be appreciated, that many ways of servicing flip requests from applications can be implemented. For purposes of discussion, it is assumed that the display driver 134 supports a waiting queue and an in-use queue though not specifically illustrated in FIG. 2.

Column 3 of the table of FIG. 2 is labeled DRIVER FLIP. An indicator in column 3 indicates that a VSYNC event has occurred and the display driver 134 is notified of this event. In response to the event, the driver updates both display controllers with a surface picked from the head of the waiting queue, and moves the surface from the waiting queue to the in-use queue. If the oldest surface in the in-use queue has last 2 VSYNC periods, it is released to make it available for the application. In one embodiment the driver updates one or more of the offset registers 163 and 166 with the surface location containing the image. The members of the in-use queue represent the surfaces currently being accessed for display on the display devices 181 and 182. In one implementation, as indicated in FIG. 2 at times T1, T7, T13, T19, T25, T31 and T37, a surface location containing specific surface data is flipped during the same time period that the vertical synchronization indicator is received from the master controller, and the corresponding flipped surface data is immediately available for display as indicate by the surface data being accessed during the same time period by the master controller. Also, as indicated in the SURFACE DATA SLAVE column, that the slave will not display the updated surface data until its own vertical synchronization indicator arrives. If the updated surface at the slave is overwritten by a newer surface before the arrival of the slave's VSYNC, the surface being overwritten is not displayed, i.e. it is skipped. Note that at time T25, in the illustrated embodiment, that surface data S4 is skipped by the slave controller since the slave was updated before the access of S4 began.

FIG. 4 illustrates a method corresponding to a surface data being flipped by the display driver 134, resulting in the surface data being indicated in column 3 of FIG. 2. At step 401, a triggering event occurs. In the illustrated embodiment, the triggering event is the receipt of a vertical synchronization indicator at the display driver 134 from the master display controller 162.

At step 402, in response to the triggering event, a determination is made whether a new surface to be displayed is available, such as an available surface being in a waiting queue. If no surface is available, the flow proceeds to step 406 where the routine returns, causing an existing surface to be displayed again. If a surface is available at step 402, flow proceeds to step 403.

At step 403 the available surface is flipped to make it available for display by the controllers 162 and 165 at their respective display devices 181 and 182 either immediately or during a subsequent refresh as discussed previously. In the embodiment of FIG. 2, the flip by the display driver 134 of a surface data occurs, and access of the flipped surface data for display by the master begins, within the same time period as the vertical synchronization from the master controller is received. See, for example, time period T1. When a waiting queue and in-use queue are being managed by the display driver, the available surface in the waiting queue would be moved onto the in-use queue as a result of a flip by the driver.

At step 404, the driver further checks if the oldest surface in the in-use queue has endured two VSYNC periods of the master. If yes, the surface is released for reuse by the application as described by step 405. Otherwise, the routine returns at 406 without releasing any surface data. As the fourth column of FIG. 2 is labeled Surface Data Released. When surface data at a particular surface location is no longer needed, it is released.

Applying step 404 of FIG. 4 to the timing table of FIG. 2, it is illustrated that in response to a first vertical synchronization indicator at time T1 that no surface data is released since no surface is displayed by either master or slave previously. At time T7 a second vertical synchronization indicator is received, indicating the master has completed its access to S1. However, surface data S1, which is the oldest surface data, is not released at time T7 because the slave controller has not completed its access to S1.

At time T13, in response to a third vertical synchronization indicator from the master controller, S1 is released since both the master and slave have completed their access to the surface. Note that the driver receives the vertical synchronization indicator at a constant time span, e.g. six time periods in FIG. 2, and updates both master and slave controllers with a new surface available in the waiting queue as depicted by FIG. 4. At time T19, in response to a fourth vertical synchronization indicator from the master controller, S2 is released because it is no longer accessed by either controller. Now S3 becomes the oldest surface in the in-use queue. In a similar manner, the display driver updates surfaces to both the master and slave controllers, moves surfaces from the waiting queue to the in-use queue, and releases surfaces not needed by either controller, in response to the VSYNC indicator from the master controller.

The display driver also provide a service for the application to determine if a surface is reusable after being sent to the driver for display via a Lock call. The service is described by FIG. 5. At step 501, the driver receives query from the application about the reusability of the given surface. The driver proceeds with step 501, determining whether the given surface is either a member of the waiting queue or a member of the in-use queue. If the surface is not a member of either queue, the driver returns SUCCESS, as of step 504, indicating the surface is reusable. Otherwise, it returns with an error message, informing that the surface is still on display. The application can use this service to synchronize its operation on the surfaces. Note, this service, in conjunction with other services/methods of the invention, guarantees that no screen tearing will occur when the application has a limited number of surfaces at its disposal.

The method and apparatus herein provides for a flexible implementation. Note also, that although an embodiment of the present invention has been shown and described in detail herein, along with certain variants thereof, many other varied embodiments that incorporate the teachings of the invention may be utilized and that logical, mechanical, chemical and electrical changes may be made without departing from the spirit or scope of the invention. For example, a synchronization indicator besides VSYNC can be used to indicate when a refresh occurs. In addition to VSYNC, Other signaling methods may also be used for this purpose, such as reading a predefined register that may indicate the completion of access to the surface. In another embodiment, a difference in refresh rates between monitors that is greater than 2× can be realized by having additional surface locations, and not releasing a specific surface data until additional vertical synchronization indicators have been received from the master controller. Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method comprising:
   allocating at least three surfaces in response to a request from an application;
   receiving a flip request from the application and determining if space is available in a waiting queue, returning with an error indicator when no space is available in the waiting queue, or placing a surface at the tail of the waiting queue when space is available;
   receiving a synchronization indicator and determining if a surface is available in the waiting queue, and updating a first display and a second display with the surface at the head of the waiting queue when a surface is available, and moving the surface at the head of the waiting queue to the in-use queue; and
   determining if an oldest surface in the in-use queue has been in the in-use queue for the reception of at least two synchronization indicators, and releasing the oldest surface when it has been in the in-use queue for at least two vertical synchronization periods.

2. The method of claim 1, wherein the synchronization indicator is a vertical synchronization indicator.

3. The method of claim 1, wherein the first display has a first refresh rate and the second display has a second refresh rate, wherein the second refresh rate is different than the first refresh rate.

4. The method of claim 3, wherein the synchronization indicator is a vertical synchronization indicator is based on the first refresh rate.

5. The method of claim 4, wherein the first refresh rate is greater than the second refresh rate.

6. The method of claim 4, wherein the first refresh rate is less than the second refresh rate.

7. A system comprising:
   a means for allocating at least three surfaces in response to a request from an application;
   a means for receiving a flip request from the application and determining if space is available in a waiting queue, returning with an error indicator when no space is available in the waiting queue, or placing a surface at the tail of the waiting queue when space is available;
   a means for receiving a synchronization indicator and determining if a surface is available in the waiting queue, and updating a first display and a second display with the surface at the head of the waiting queue when a surface is available, and moving the surface at the head of the waiting queue to the in-use queue; and
   a means determining if an oldest surface in the in-use queue has been in the in-use queue for the reception of at least two synchronization indicators, and releasing the oldest surface when it has been in the in-use queue for at least two vertical synchronization periods.

8. The system of claim 7, wherein the synchronization indicator is a vertical synchronization indicator.

9. The system of claim 7, wherein the first display has a first refresh rate and the second display has a second refresh rate, wherein the second refresh rate is different than the first refresh rate.

10. The system of claim 9, wherein the synchronization indicator is a vertical synchronization indicator is based on the first refresh rate.

11. The system of claim 10, wherein the first refresh rate is greater than the second refresh rate.

12. The system of claim 10, wherein the first refresh rate is less than the second refresh rate.

13. A computer readable medium comprising instructions which when executed are for implementing a plurality of operations comprising:
    allocating at least three surfaces in response to a request from an application;
    determining, in response to receiving a flip request from the application, if space is available in a waiting queue, and returning with an error indicator when no space is available in the waiting queue, or placing a surface at the tail of the waiting queue when space is available;
    determining, in response to receiving a synchronization indicator, if a surface is available in the waiting queue, and updating a first display and a second display with the surface at the head of the waiting queue when a surface is available, and moving the surface at the head of the waiting queue to the in-use queue; and
    determining if an oldest surface in the in-use queue has been in the in-use queue for the reception of at least two synchronization indicators, and releasing the oldest surface when it has been in the in-use queue for at least two vertical synchronization periods.

14. The instructions of claim 13, wherein the synchronization indicator is a vertical synchronization indicator.

* * * * *